(12) United States Patent
Yang et al.

(10) Patent No.: US 10,166,882 B2
(45) Date of Patent: *Jan. 1, 2019

(54) POWER SYSTEM FOR ELECTRIC VEHICLE

(71) Applicant: BYD COMPANY LIMITED, Shenzhen (CN)

(72) Inventors: Guangming Yang, Shenzhen (CN); Jian Liu, Shenzhen (CN); Yilong Yu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 356 days.

This patent is subject to a terminal disclaimer.

(21) Appl. No.: 14/900,798

(22) PCT Filed: Jun. 30, 2014

(86) PCT No.: PCT/CN2014/081242
§ 371 (c)(1),
(2) Date: Dec. 22, 2015

(87) PCT Pub. No.: WO2014/206368
PCT Pub. Date: Dec. 31, 2014

(65) Prior Publication Data
US 2016/0152151 A1    Jun. 2, 2016

(30) Foreign Application Priority Data

Jun. 28, 2013 (CN) .......................... 2013 1 0268814

(51) Int. Cl.
*H02J 7/00* (2006.01)
*B60L 11/18* (2006.01)
(Continued)

(52) U.S. Cl.
CPC ......... *B60L 11/187* (2013.01); *B60L 11/1805* (2013.01); *B60L 11/1809* (2013.01);
(Continued)

(58) Field of Classification Search
CPC ..................................................... B60L 11/187
(Continued)

(56) References Cited

U.S. PATENT DOCUMENTS

| 6,441,588 B1 | 8/2002 | Yagi et al. |
| 2011/0050173 A1 | 3/2011 | King et al. |

(Continued)

FOREIGN PATENT DOCUMENTS

| CN | 101931110 A | 12/2010 |
| CN | 201752075 U | 2/2011 |

(Continued)

OTHER PUBLICATIONS

The World Intellectual Property Organization (WIPO) International Search Report for PCT/CN2014/081242 dated Sep. 26, 2014.

*Primary Examiner* — Yalkew Fantu
(74) *Attorney, Agent, or Firm* — Anova Law Group, PLLC

(57) ABSTRACT

A power system for an electric vehicle, an electric vehicle and a method for charging a power battery are provided. The power system includes: a power battery (10); a charge-discharge socket (20); a bidirectional DC-DC module (30); a driving control switch (40); a bidirectional DC-AC module (50); a motor (M); a motor control switch (60); a charge-discharge control module (70); a battery manager (108); and a control module (80) configured to control the driving control switch (40), the motor control switch (60) and the charge-discharge control module (70) so as to control the power system to enter a charge-discharge mode, and to control the power battery (10) to charge and discharge in a pulse mode so as to heat the power battery (10) when the temperature of the power battery (10) is lower than a predetermined temperature.

20 Claims, 13 Drawing Sheets

(51) Int. Cl.
  *H02J 7/02*   (2016.01)
  *H02J 5/00*   (2016.01)
  *H02J 3/32*   (2006.01)

(52) U.S. Cl.
  CPC ....... *B60L 11/1812* (2013.01); *B60L 11/1816* (2013.01); *B60L 11/1838* (2013.01); *B60L 11/1875* (2013.01); *H02J 3/32* (2013.01); *H02J 5/00* (2013.01); *H02J 7/02* (2013.01); *H02J 7/022* (2013.01); *B60L 2240/545* (2013.01); *Y02E 60/721* (2013.01); *Y02T 10/705* (2013.01); *Y02T 10/7005* (2013.01); *Y02T 10/7072* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(58) Field of Classification Search
  USPC ......................................................... 320/109
  See application file for complete search history.

(56) References Cited

U.S. PATENT DOCUMENTS

| | | |
|---|---|---|
| 2012/0025773 A1 | 2/2012 | Wang et al. |
| 2012/0277058 A1 | 11/2012 | Ishikawa |

FOREIGN PATENT DOCUMENTS

| | | |
|---|---|---|
| CN | 102005804 A | 4/2011 |
| CN | 102055042 A | 5/2011 |
| CN | 102201693 A | 9/2011 |
| CN | 202006766 U | 10/2011 |
| CN | 202134949 U | 2/2012 |
| CN | 102479983 A | 5/2012 |
| CN | 202423513 U | 9/2012 |
| CN | 202435108 U | 9/2012 |
| CN | 202455130 U | 9/2012 |
| CN | 102709994 A | 10/2012 |
| CN | 102848931 A | 1/2013 |
| CN | 103023411 A | 4/2013 |
| JP | S6412831 A | 1/1989 |
| JP | H07231513 A | 8/1995 |
| JP | H10210649 A | 8/1998 |
| JP | 2000209702 A | 7/2000 |
| JP | 2002125326 A | 4/2002 |
| JP | 2005160263 A | 6/2005 |
| JP | 2006333647 A | 12/2006 |
| JP | 2010124536 A | 6/2010 |
| JP | 2010288415 | 12/2010 |
| JP | 2011030312 A | 2/2011 |
| JP | 2011055700 A | 3/2011 |
| JP | 2011147252 A | 7/2011 |
| JP | 2011188601 A | 9/2011 |
| JP | 2012044766 A | 3/2012 |
| JP | 2012100459 A | 5/2012 |
| JP | 2013027144 A | 2/2013 |
| JP | 2013504291 A | 2/2013 |
| WO | 2013042988 A2 | 3/2013 |

POWER SYSTEM FOR ELECTRIC VEHICLE

CROSS REFERENCE TO RELATED APPLICATION

This application is a national phase entry under 35 U.S.C. § 371 of International Application No. PCT/CN2014/081242, filed on Jun. 30, 2014, which claims priority and benefits of Chinese Patent Application No. 201310268814.9, filed with State Intellectual Property Office on Jun. 28, 2013, the entire content of which is incorporated herein by reference.

FIELD

Embodiments of the present disclosure generally relate to an electric vehicle field, and more particularly to a power system for an electric vehicle, an electric vehicle having the power system and a method for charging a power battery of the electric vehicle.

BACKGROUND

With an increasingly serious global energy crisis, electric vehicle with advantages of saving energy and reducing pollution has drawn much attention. A power battery in an electric vehicle may store a great deal of energy. Currently, a lithium iron phosphate (LiFePO$_4$) battery is widely adopted as the power battery in the electric vehicle due to its numerous advantages, such as high discharge rate (5-10 C), stable discharging voltage, safety in use, long service life and low environmental pollution. However, when the lithium iron phosphate battery used as an in-vehicle power battery works in a low temperature environment, an internal resistance of the battery becomes too large such that the battery is difficult to be charged.

SUMMARY

Embodiments of the present disclosure seek to solve at least one of the problems existing in the related art to at least some extent.

According to embodiments of a first broad aspect of the present disclosure, a power system for an electric vehicle is provided. The system includes: a power battery; a charge-discharge socket; a bidirectional DC-DC module having a first DC terminal connected with a first terminal of the power battery and a second DC terminal connected with a second terminal of the power battery, wherein the first DC terminal is a common terminal for an input to and an output from the bidirectional DC-DC module; a driving control switch having a first terminal connected with the second terminal of the power battery and a second terminal connected with a third DC terminal of the bidirectional DC-DC module; a bidirectional DC-AC module having a first DC terminal connected with the second terminal of the driving control switch and a second DC terminal connected with the first terminal of the power battery; a motor; a motor control switch having a first terminal connected with an AC terminal of the bidirectional DC-AC module and a second terminal connected with the motor; a charge-discharge control module having a first terminal connected with the AC terminal of the bidirectional DC-AC module and a second terminal connected with the charge-discharge socket; a battery manager connected with the power battery and configured to detect a temperature of the power battery; a control module connected with a third terminal of the driving control switch, a third terminal of the motor control switch a third terminal of the charge-discharge control module and the battery manager respectively, and configured to control the driving control switch, the motor control switch and the charge-discharge control module so as to control the power system to enter a charge-discharge mode, and to control the power battery to charge and discharge in a pulse mode so as to heat the power battery when the temperature of the power battery is lower than a predetermined temperature.

With the power system for the electric vehicle according to embodiments of the present disclosure, the power battery in the electric vehicle can be charged with a high power via a civil or industrial AC (alternating current) grid, such that the power battery may be charged promptly, efficiently, and whenever and wherever necessary, thus saving a charging time. Moreover, when the temperature of the power battery is low, the power battery can be controlled to charge and discharge in a pulse mode so as to heat the power battery, thus increasing the temperature of the power battery and activating the power battery. And then the power battery can be charged or discharged in a normal mode. In addition, the power system according to embodiments of the present disclosure has advantages of low cost, low energy consumption and high reliability.

According to embodiments of a second broad aspect of the present disclosure, an electric vehicle is provided. The electric vehicle includes the above power system. The electric vehicle can be charged with a high power via a three-phase or single-phase power, such that the electric vehicle may be charged promptly, efficiently, and whenever and wherever necessary, thus saving a charging time. Moreover, when a temperature of a power battery is low, the power battery can be controlled to charge and discharge in a pulse mode so as to heat the power battery, thus increasing the temperature of the power battery and activating the power battery. And then the power battery can be charged or discharged in a normal mode. In addition, the electric vehicle according to embodiments of the present disclosure has advantages of low cost, low energy consumption and high reliability.

According to embodiments of a third broad aspect of the present disclosure, a method for charging a power battery of an electric vehicle is provided. The method includes: detecting a temperature of the power battery, when a power system of the electric vehicle is in a charge-discharge mode; and controlling the power battery to charge and discharge in a pulse mode so as to heat the power battery, when the temperature of the power battery is lower than a predetermined temperature.

With the method for charging the power battery of the electric vehicle according to embodiments of the present disclosure, when the temperature of the power battery is low, the power battery is controlled to charge and discharge in a pulse mode so as to heat the power battery, thus increasing the temperature of the power battery and activating the power battery. And then the power battery can be charged or discharged in a normal mode. The method for charging the power battery according to embodiments of the present disclosure is simple and reliable.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
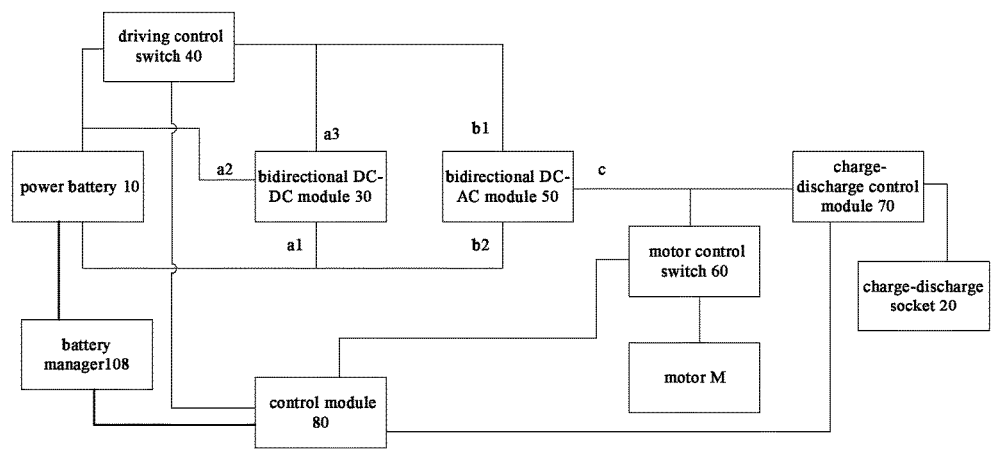
FIG. 1 is a schematic view of a power system for an electric vehicle according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The following description provides a plurality of embodiments or examples configured to achieve different structures of the present disclosure. In order to simplify the publication of the present disclosure, components and dispositions of the particular embodiment are described in the following, which are only explanatory and not construed to limit the present disclosure. In addition, the present disclosure may repeat the reference number and/or letter in different embodiments for the purpose of simplicity and clarity, and the repeat does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present disclosure, unless specified or limited otherwise, it should be noted that, terms "mounted," "connected" and "coupled" may be understood broadly, such as electronic connection or mechanical connection, inner communication between two elements, direct connection or indirect connection via intermediary. These having ordinary skills in the art should understand the specific meanings in the present disclosure according to specific situations.

With reference to the following descriptions and drawings, these and other aspects of embodiments of the present disclosure will be distinct. In the descriptions and drawings, some particular embodiments are described in order to show means of the principles of embodiments according to the present disclosure, however, it should be appreciated that the scope of embodiments according to the present disclosure is not limited. On the contrary, embodiments of the present disclosure include all the changes, alternatives, and modifications falling into the scope of the spirit and principles of the attached claims.

A power system for an electric vehicle, an electric vehicle having the power system and a method for charging a power battery of an electric vehicle will be described in the following with reference to drawings.

As shown in FIG. 1, a power system for an electric vehicle according to embodiments of the present disclosure includes a power battery 10, a charge-discharge socket 20, a bidirectional DC-DC module 30, a driving control switch 40, a bidirectional DC-AC module 50, a motor M, a motor control switch 60, a charge-discharge control module 70, a battery manager 108 and a control module 80.

The bidirectional DC-DC module 30 has a first DC terminal a1 connected with a first terminal of the power battery 10 and a second DC terminal a2 connected with a second terminal of the power battery 10. The first DC terminal a1 is a common terminal for an input to and an output from the bidirectional DC-DC module 30. The driving control switch 40 has a first terminal connected with the second terminal of the power battery 10 and a second terminal connected with a third DC terminal a3 of the bidirectional DC-DC module 30. The bidirectional DC-AC module 50 has a first DC terminal b1 connected with the second terminal of the driving control switch 40 and a second DC terminal b2 connected with the first terminal of the power battery 10. The motor control switch 60 has a first terminal connected with an AC terminal c of the bidirectional DC-AC module 50 and a second terminal connected with the motor M for the electric vehicle. The charge-discharge control module 70 has a first terminal connected with the AC terminal c of the bidirectional DC-AC module 50 and a second terminal connected with the charge-discharge socket 20. The battery manager 108 is connected with the power battery 10 and configured to detect a temperature of the power battery 10. The control module 80 is connected with third terminals of the driving control switch 40, the motor control switch 60 and the charge-discharge control module 70 and the battery manager 108 respectively, and is configured to control the driving control switch 40, the motor control switch 60 and the charge-discharge control module 70 so as to control the power system to enter a charge-discharge mode, and to control the power battery 10 to charge and discharge in a pulse mode so as to heat the power battery 10 when the temperature of the power battery 10 is lower than a predetermined temperature.

In an embodiment of the present disclosure, when the temperature of the power battery 10 is higher than or equal to the predetermined temperature, the control module 80 is further configured to control the power battery 10 to stop charging and discharging in the pulse mode so as to stop heating the power battery 10 and to control the power battery 10 to charge and discharge in a normal mode.

In other words, in embodiments of the present disclosure, after a charging gun is inserted into the electric vehicle and a charge detection is finished, the control module 80 controls the power system to switch into the charge-discharge mode. And then the battery manager 108 detects the temperature of the power battery 10. If the temperature of the power battery 10 is lower than the predetermined temperature, a power battery heating function is started, and the power battery 10 is charged or discharged in the pulse mode. That is, a grid connection power supplying and an AC charging are implemented to the power system so as to make an internal resistor of the power battery generate heat, thus heating the power battery 10. When the temperature of the power battery 10 reaches the predetermined temperature, the control module 80 controls the power battery 10 to stop charging and discharging in the pulse mode so as to stop heating the power battery 10 and to control the power battery 10 to charge and discharge in a normal mode.

In embodiments of the present disclosure, a working mode of the power system includes a driving mode and the charge-discharge mode. In other words, the working mode of the electrical vehicle may include the driving mode and the charge-discharge mode. It should be noted that the charge-discharge mode means that the electric vehicle is either in a charging mode or in a discharging mode. When the power system is in the driving mode, the control module 80 controls the driving control switch 40 to turn on so as to turn off the bidirectional DC-DC module 30, and controls the motor control switch 60 to turn on so as to drive the motor M normally, and controls the charge-discharge control module 70 to turn off. The control module 80 controls the driving control switch 40 to turn off so as to start the bidirectional DC-DC module 30, and controls the motor control switch 60 to turn off so as to exclude the motor M, and control the charge-discharge control module 70 to turn on, such that the power system can enter the charge-discharge mode and an external power source can charge the power battery 10 normally. The first DC terminal a1 of the bidirectional DC-AC module 30 is connected with a negative terminal of a DC bus of the power battery 10 (i.e., the first terminal of the power battery 10) and the third DC terminal a3 of the bidirectional DC-AC module 30 is connected with a positive terminal of the DC bus of the power battery 10 (i.e., the second terminal of the power battery 10).

Figure 2:
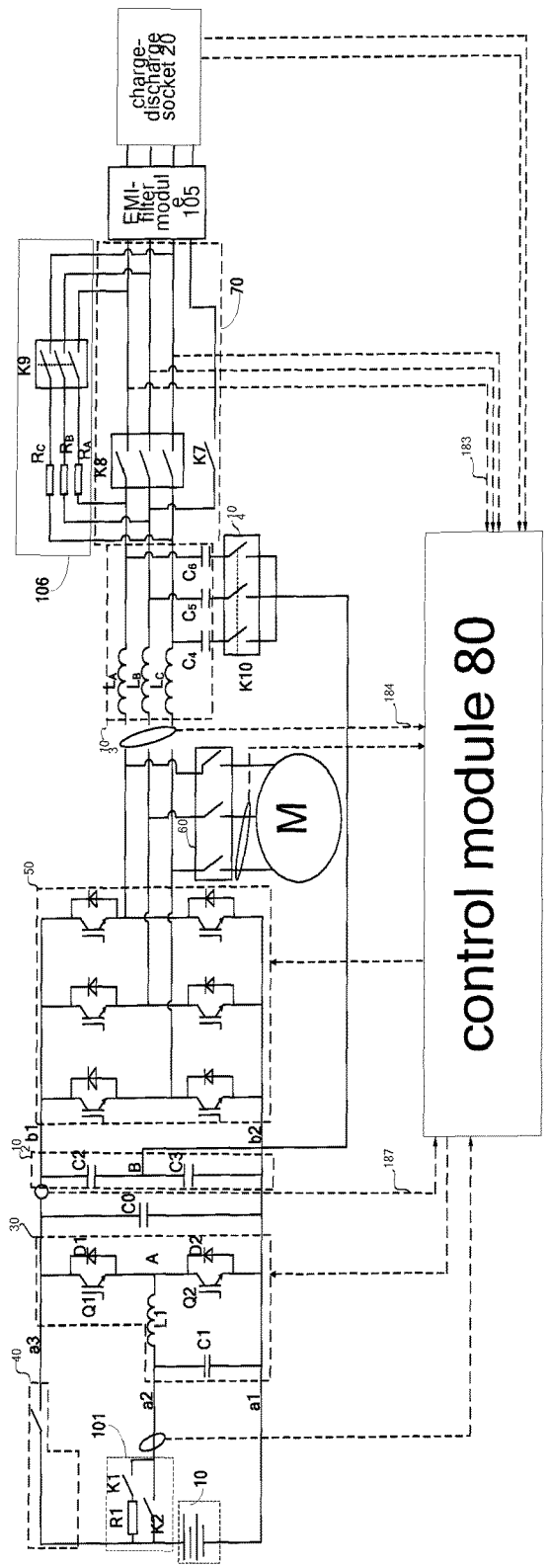
FIG. 2 is a circuit diagram of a power system for an electric vehicle according to an embodiment of the present disclosure.

In an embodiment of the present disclosure, as shown FIG. 2, the power system for the electric vehicle further includes a first precharging control module 101. The first precharging control module 101 has a first terminal connected with the second terminal of the power battery 10 and a second terminal connected with the second DC terminal a2 of the bidirectional DC-DC module 30, and is configured to precharge a first capacitor C1 in the bidirectional DC-DC module 30 and a bus capacitor C0. The bus capacitor C0 is connected between the first DC terminal a1 and the third DC terminal a3 of the bidirectional DC-DC module 30. The first precharging control module 101 includes: a first resistor R1, a first switch K1 and a second switch K2. The first resistor R1 has a first terminal connected with a first terminal of the first switch K1 and a second terminal connected with the second terminal of the power battery 10. The first switch K1 has a second terminal connected with the second DC terminal a2 of the bidirectional DC-DC module 30. The first resistor R1 and the first switch K1 are connected in series, and then are connected with the second switch K2 in parallel. When the power system starts, the control module 80 controls the first switch K1 to turn on to precharge the first capacitor C1 in the bidirectional DC-DC module 30 and the bus capacitor C0. When a voltage of the bus capacitor C0 is a predetermined times of a voltage of the power battery 10, the control module 80 controls the first switch K1 to turn off and controls the second switch K2 to turn on.

As shown in FIG. 2, the bidirectional DC-DC module 30 includes: a first switching transistor Q1, a second switching transistor Q2, a first diode D1, a second diode D2, a first inductor L1 and the first capacitor C1. The first switching transistor Q1 and the second switching transistor Q2 are connected in series, and are connected between the first DC terminal a1 and the third DC terminal a3 of the bidirectional DC-DC module 30, and are controlled by the control module. Moreover, a first node A is defined between the first switching transistor Q1 and the second switching transistor Q2. The first diode D1 is connected with the first switching transistor Q1 in inverse parallel, and the second diode D2 is connected with the second switching transistor Q2 in inverse parallel. The first inductor L1 has a first terminal connected with the first node A and a second terminal connected with the second terminal of the power battery 10. The first capacitor C1 has a first terminal connected with the second terminal of the first inductor L1 and a second terminal connected with the first terminal of the power battery 10.

In an embodiment of the present disclosure, as shown in FIG. 2, the power system for the electric vehicle further includes a leakage current reducing module 102. The leakage current reducing module 102 is connected between the first DC terminal a1 and the third DC terminal a3 of the bidirectional DC-DC module 30. Specifically, the leakage current reducing module 102 includes a second capacitor C2 and a third capacitor C3. The second capacitor C2 has a first terminal connected with a first terminal of the third capacitor C3 and a second terminal connected with the third DC terminal a3 of the bidirectional DC-DC module 30, and the third capacitor has a second terminal connected with the first DC terminal a1 of the bidirectional DC-DC module 30, and a second node B is defined between the second capacitor C2 and the third capacitor C3.

A grid connection system generally has a large leakage current grid connection. In one embodiment, the leakage current reducing module 102 provided between the positive terminal and the negative terminal of the DC bus can reduce the leakage current effectively. The leakage current reducing module 102 includes the second capacitor C2 and the third capacitor C3 in a same type. The second capacitor C2 disposed between the positive terminal of the DC bus and the second node B (i.e., a midpoint potential of a three-phase AC), and the third capacitor C3 is disposed between the negative terminal of the DC bus and the second node B, such that a generated high-frequency current can be fed back to a DC side of the power system, thus reducing a residual current effectively.

In an embodiment of the present disclosure, as shown in FIG. 2, the power system for the electric vehicle further includes sinusoidal filtering modules 103, 104, an EMI (Electro Magnetic Interference)-filter module 105 and a second precharging control module 106.

The sinusoidal filtering module 103 is connected between the bidirectional DC-AC module 50 and the charge-discharge control module 70. Specifically, as shown in FIG. 2, the sinusoidal filtering module 103 includes inductors LA, LB, LC connected in parallel and capacitors C4, C5, C6 connected in parallel, in which the inductor LA is connected with the capacitor C6 in series, the inductor LB is connected with the capacitor C5 in series and the inductor LC is connected with the capacitor C4 in series. The bidirectional DC-AC module 50 may include six IGBTs (Insulated Gate Bipolar Transistors), and a connecting node between each adjacent upper and lower IGBTs is connected with the sinusoidal filtering module 103 and the motor control switch 60 via a power bus.

As shown in FIG. 2, the sinusoidal filtering control module 104 is connected between the second node B and the sinusoidal filtering module 103, and is controlled by the control module 80. When the power system is in the driving mode, the control module 80 controls the sinusoidal filtering control module 104 to turn off. The sinusoidal filtering control module 104 may be a capacitor switching relay and may include a contactor K10. In this configuration, there are three contactors K10 corresponding to the capacitors C4, C5, C6 respectively. The EMI-filter module 105 is connected between the charge-discharge socket 20 and the charge-discharge control module 70 and is configured to filter interference of conduction and radiation.

The second precharging module 106 is connected with the charge-discharge control module 70 and is configured to precharge the capacitors C4, C5 and C6 in the sinusoidal filtering module 103. The second precharging module 106 includes resistors RA, RB, RC connected in parallel and a three-phase precharging switch K9.

In an embodiment of the present disclosure, as shown in FIG. 2, the charge-discharge control module 70 includes a three-phase switch K8 and/or a single-phase switch K7 which are configured to implement a three-phase charge or a single-phase charge.

In other words, in embodiments of the present disclosure, when the power system starts, the control module 80 controls the first switch K1 to turn on so as to precharge the first capacitor C1 in the bidirectional DC-DC module 30 and the bus capacitor C0; when the voltage of the bus capacitor C0 is the predetermined times of the voltage of the power battery 10, the control module 80 controls the first switch K1 to turn off and controls the second switch K2 to turn on.

When the power system is in the driving mode, the control module 80 controls the driving control switch 40 to turn on so as to turn off the bidirectional DC-DC module 30, and controls motor control switch 60 to turn on so as to drive the motor M normally, and controls the charge-discharge control module 70 to turn off. Therefore, a direct current from the power battery 10 is inverted into an alternating current via the bidirectional DC-AC module 50, and the alternating current is transmitted to the motor M. The motor M can be controlled by a revolving transformer decoder technology and a space vector pulse width modulation (SVPWM) control algorithm.

When the power system is in the charge-discharge mode, the control module 80 controls the driving control switch 40 to turn off so as to start the bidirectional DC-DC module 30, and controls the motor control switch 60 to turn off so as to exclude the motor M, and controls the charge-discharge module 70 to turn on, such that the external power source (such as a three-phase or single-phase power source) can charge the power battery 10 normally via the charge-discharge socket 20. In other words, by detecting a charge connection signal, an AC power system and vehicle battery management information, a controllable rectification function can be implemented via the bidirectional DC-AC module 50, and the power battery 10 can be charged by the single-phase power and/or the three-phase power via the bidirectional DC-DC module 30. When the temperature of the power battery 10 is lower than the predetermined temperature, the power battery 10 is charged and discharged in the pulse mode, so as to increase the temperature of the power battery 10 and to activate the power battery 10. When the temperature of the power battery is higher than or equal to the predetermined temperature, the control module 80 controls the power battery 10 to stop charging and discharging in the pulse mode, so as to stop heating the power battery 10, and then the control module 80 controls the power battery 10 to charge and discharge in the normal mode.

With the power system for the electric vehicle according to embodiments of the present disclosure, the power battery in the electric vehicle can be charged with a high power via a civil or industrial AC (alternating current) grid, such that the power battery may be charged promptly, efficiently, and whenever and wherever necessary, thus saving a charging time. Moreover, when the temperature of the power battery is low, the power battery can be controlled to charge and discharge in a pulse mode so as to heat the power battery, thus increasing the temperature of the power battery and activating the power battery. And then the power battery can be charged or discharged in a normal mode. In addition, the power system according to embodiments of the present disclosure has advantages of low cost, low energy consumption and high reliability.

Figure 3:
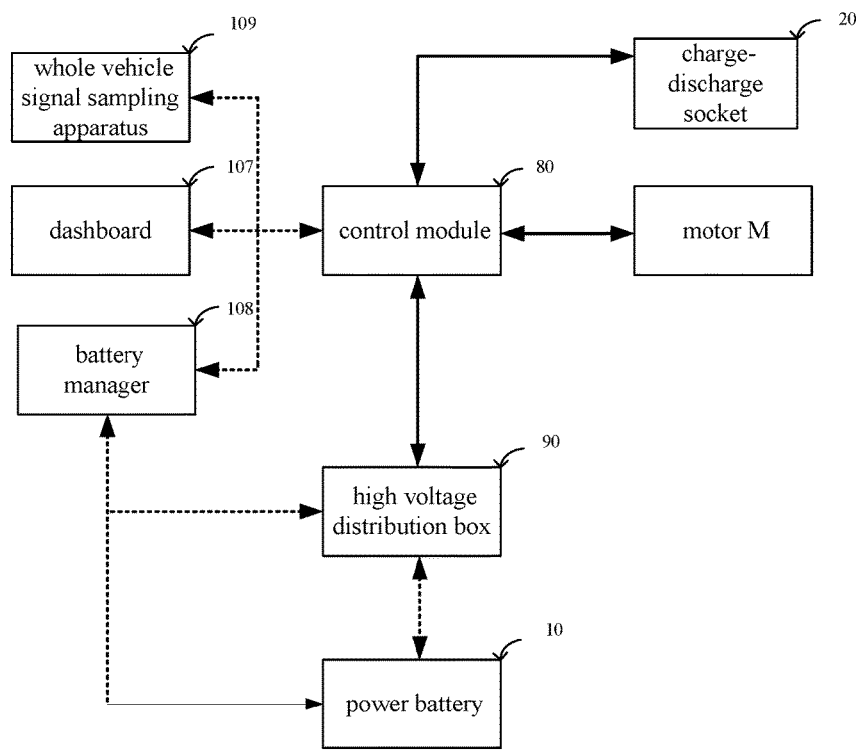
FIG. 3 is a schematic view of a power system for an electric vehicle according to an embodiment of the present disclosure.

In addition, in an embodiment of the present disclosure, as shown in FIG. 3, the power system for the electric vehicle further includes a high voltage distribution box 90, a dashboard 107, the battery manager 108 and a whole vehicle signal sampling apparatus 109. The control module 60 is connected with the high voltage distribution box 101, the dashboard 102, the battery manager 103 and the whole vehicle signal sampling apparatus 104 respectively. The battery manager 103 is connected with the high voltage distribution box 101 and the power battery 10. The driving control module 40, the first switch K1 and the second switch K2 may be disposed in the high voltage distribution box 90.

Figure 4:
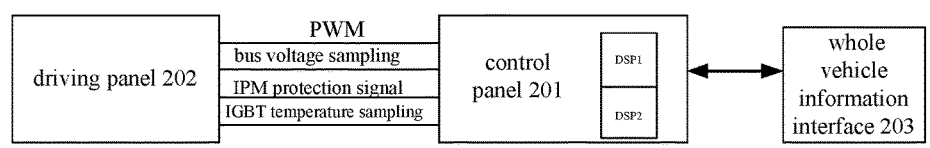
FIG. 4 is a schematic view of a control module according to an embodiment of the present disclosure.

In an embodiment of the present disclosure, as shown in FIG. 4, the control module 80 includes a control panel 201 and a driving panel 202. The control panel 201 includes two high-speed digital signal processing chips (i.e., DSP1 and DSP2). The two DSPs are connected and communicate with a whole vehicle information interface 203. The two DSPs are configured to receive a bus voltage sampling signal, an IPM protection signal and an IGBT temperature sampling signal and so on sent from a driving unit on the driving panel 202, and to output a pulse width modulation (PWM) signal to the driving unit synchronously.

Figure 5:
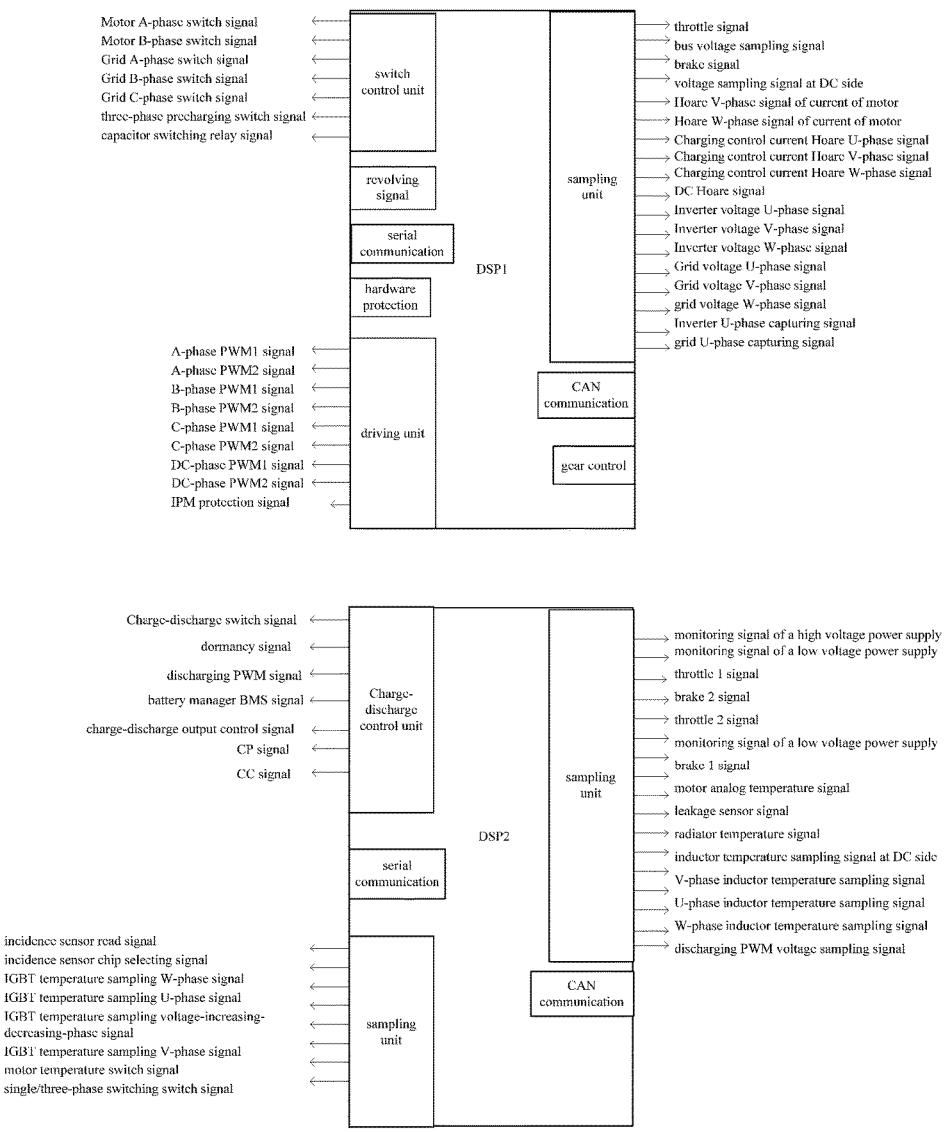
FIG. 5 is a schematic view showing interfaces between DSPs (digital signal processor) in a control module according to an embodiment of the present disclosure and peripheral hardware.

As shown in FIG. 5, the DSP1 is mainly configured to control and the DSP2 is mainly configured to sample information. A sampling unit in the DSP1 outputs sampling signals including a throttle signal, the bus voltage sampling signal, a brake signal, a voltage sampling signal at the DC side, a Hoare V-phase signal of a current of the motor M, a Hoare W-phase signal of the current of the motor M, a charging control current Hoare U-phase signal, a charging control current Hoare V-phase signal, a charging control current Hoare W-phase signal, a DC Hoare signal, an inverter voltage U-phase signal, an inverter voltage V-phase signal, an inverter voltage W-phase signal, a grid voltage U-phase signal, a grid voltage V-phase signal, a grid voltage W-phase signal, an inverter U-phase capturing signal and a grid U-phase capturing signal. A switch control unit in the DSP1 outputs a motor A-phase switch signal, a motor B-phase switch signal, a grid A-phase switch signal, a grid B-phase switch signal, a grid C-phase switch signal, a three-phase precharging switch signal and a capacitor switching relay signal. A driving unit in the DSP1 outputs an A-phase PWM1 signal, an A-phase PWM2 signal, a B-phase PWM1 signal, a B-phase PWM2 signal, a C-phase PWM1 signal, a C-phase PWM2 signal, a DC-phase PWM1 signal, a DC-phase PWM2 signal and an IPM protection signal. In addition, the DSP1 also has additional functions such as revolving signal output control, serial communication, hardware protection, CAN communication and gear control. A sampling unit in the DSP2 outputs a monitoring signal of a high voltage power supply, a monitoring signal of a low voltage power supply, a throttle 1 signal, a brake 2 signal, a throttle 2 signal, a brake signal, a motor analog temperature signal, a leakage sensor signal, a radiator temperature signal, an inductor temperature sampling signal at the DC side, a V-phase inductor temperature sampling signal, a U-phase inductor temperature sampling signal, a W-phase inductor temperature sampling signal, a discharging PWM voltage sampling signal, an incidence sensor read signal, an incidence sensor chip selecting signal, an IGBT temperature sampling W-phase signal, an IGBT temperature sampling U-phase signal, an IGBT temperature sampling voltage-increasing-decreasing-phase signal, an IGBT temperature sampling V-phase signal, a motor temperature switch signal, a single/three-phase switching switch signal. A charge-discharge control unit in the DSP2 outputs a charge-discharge switch signal, a dormancy signal, a discharging PWM signal, a battery manager BMS signal, a charge-discharge output control signal, a CP signal and a CC signal. The DSP2 also has additional functions such as CAN communication and serial communication.

Accordingly, the power system for the electric vehicle according to embodiments of the present disclosure has numerous functions including motor diving, vehicle control, AC charging, grid connection power supplying, off-grid on-load and vehicle mutual-charging. Moreover, the power system is established not by simply and physically combining various functional modules, but by introducing peripheral devices based on a motor driving control system, thus saving space and cost to a maximum extent and improving a power density.

Specifically, functions of the power system for the electric vehicle are simply described in the following.

1. Motor Driving Function

A DC electricity from the power battery 10 is inverted into an AC electricity via the bidirectional DC-AC module 50 and the alternating current is transmitted to the motor M. The motor M can be controlled by the revolving transformer decoder technology and the SVPWM control algorithm.

Figure 6:
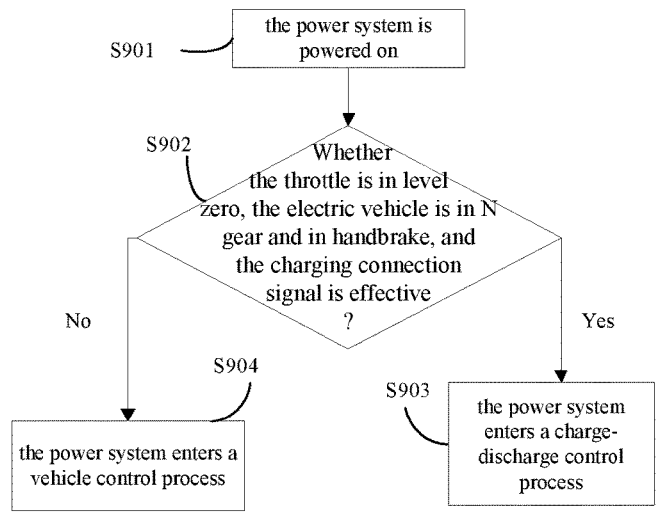
FIG. 6 is a flow chart of determining a function of a power system for an electric vehicle according to an embodiment of the present disclosure.

As shown in FIG. 6, a process of determining a function of the power system includes the following steps.

At step S901, the power system is powered on.

At step S902, the throttle signal, the gear signal, the brake signal and the charge connection signal are determined.

When the throttle is in level zero, the electric vehicle is in N gear and in handbrake, and the charge connection signal (i.e., a CC signal) is effective (that is, the charge-discharge socket is connected with a charge-discharge connection device), step S903 is executed; or else, step S904 is executed.

At step S903, the power system enters a charge-discharge control process.

At step S904, the power system enters a vehicle control process.

After step S904, the control module 80 controls the motor control switch 60 to turn on, and informs the battery manager 108 via a CAN communication. The battery manager 108 controls the high voltage distribution box 90 to precharge the first capacitor C1 and the bus capacitor C0, the control module 80 detects a bus voltage (i.e., a voltage of the bus capacitor C0) to determine whether the precharge is successful. If the precharge is successful, the control module 80 informs the battery manager 108, and the battery manager 108 controls the driving control switch 40 to turn on, such that the power system is in the driving mode and the control module 80 samples the whole vehicle information and drives the motor M according to the whole vehicle information.

Figure 7:
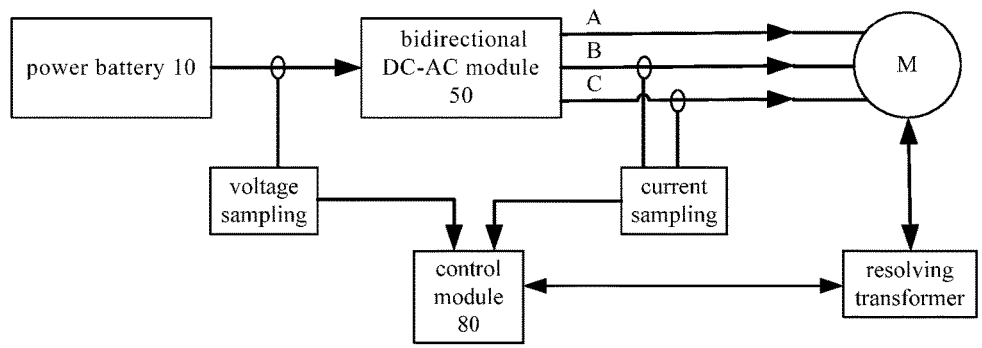
FIG. 7 is a schematic view showing a power system for an electric vehicle executing a motor driving control function according to an embodiment of the present disclosure.

A motor driving control function is executed. As shown in FIG. 7, the control module 80 sends a PWM signal to control the bidirectional DC-AC module 50, so as to invert the direct current of the power battery 10 into the alternating current and transmit the alternating current to the motor M. Subsequently, the control module 80 controls a revolving transformer to resolve a rotor location and also controls the bus voltage and the motor B/C-phase current to be sampled so as to make the motor M operate precisely. In other words, the control module 80 adjusts the PWM signal according to the sampled motor B/C-phase current and feedback information of the revolving transformer, such that the motor M can operate precisely.

Therefore, by sampling the throttle, the brake and the gear information of the whole vehicle and determining a current working state of the vehicle according to the sampled information, accelerating, decelerating and a performance feedback can be realized, such that the whole vehicle can operates safely and reliably under any condition, thus ensuring the safety, dynamic performance and smooth running of the vehicle.

Figure 8:
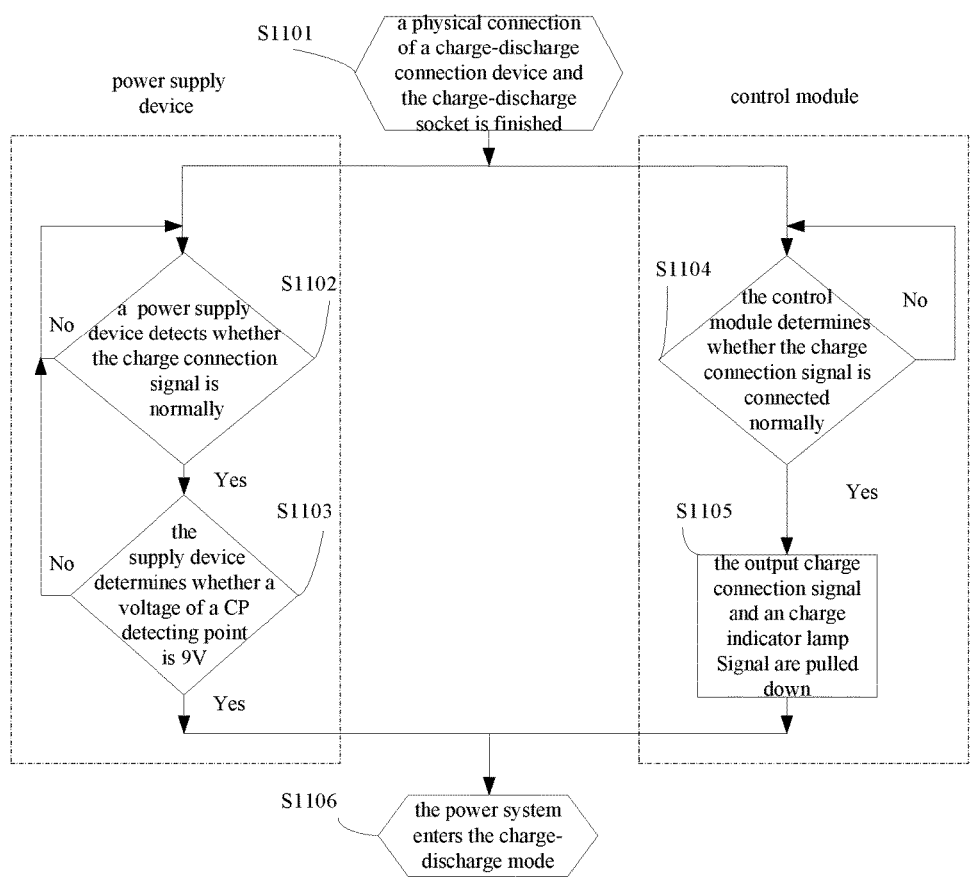
FIG. 8 is a flow chart of determining whether to start a charge-discharge function for a power system for an electric vehicle according to an embodiment of the present disclosure.

2. Charge-Discharge Function (1) Connection Confirmation and Start of the Charge-Discharge Function As shown in FIG. 8, determining whether to start the charge-discharge function of the power system includes the following steps.

At step S1101, a physical connection of a charge-discharge-discharge connection device and the charge-discharge socket 20 is completed.

At step 1102, a power supply device detects whether the charge connection signal (i.e. the CC signal) is normal. If yes, step S1103 is executed; if no, step S1102 is returned for another determining.

At step S1103, the power supply device determines whether a voltage of a CP detecting point is 9V. If yes, execute step S1106; if no, return to step S1102. It should be noted that 9V is an exemplary predetermined value and is not for limiting the disclosure.

At step S1104, the control module 80 determines whether the charge connection signal is connected normally. If yes, step S1105 is executed; if no, step S1104 is returned for another determining.

At step S1105, the output charge connection signal CC and a charge indicator lamp signal are pulled down.

At step S1106, the power system performs the charge or discharge function, that is, the power system is in the charge-discharge mode.

Figure 9:
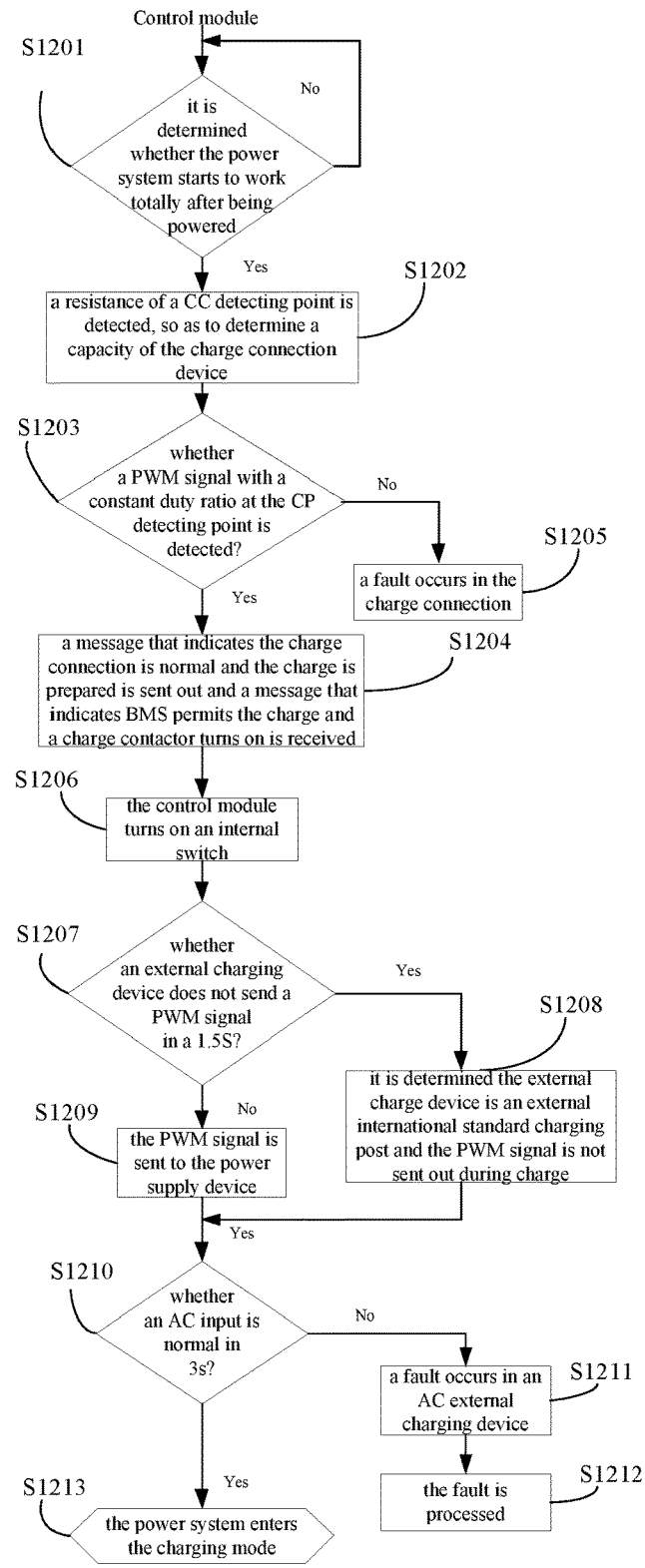
FIG. 9 is a flow chart of controlling a power system for an electric vehicle according to an embodiment of the present disclosure in a charging mode.

As shown in FIG. 9, a process of controlling the power system in the charging mode includes following steps.

At step S1201, it is determined whether the power system starts to work totally after being powered on. If yes, step S1202 is executed; if no, step S1201 is returned for another determining.

At step S1202, a resistance of a CC (charge connection) detecting point is detected, so as to determine a capacity of the charge-discharge connection device.

At step S1203, it is determined whether a PWM signal with a constant duty ratio at the CP detecting point is detected. If yes, step S1204 is executed; if no, step S1205 is executed.

At step S1204, a message that indicates the charge connection is normal and the charge is prepared is sent out and a message that indicates BMS permits the charge and a charge contactor turns on is received, and then execute step S1206.

At step S1205, a fault occurs in the charge connection.

At step S1206, the control module 80 turns on an internal switch.

At step S1207, it is determined whether an AC external charging device does not send a PWM signal in a predetermined time such as 1.5 second. If yes, execute step S1208; if no, execute step S1209.

At step S1208, it is determined that the external charging device is an external international standard charging post and the PWM signal is not sent out during charge.

At step S1209, the PWM signal is sent to the power supply device.

At step S1210, it is determined whether the AC input is normal in a predetermined time such as 3 seconds. If yes, step S1213 is executed; if no, step S1211 is executed.

At step S1211, a fault occurs in the AC external charging device.

At step S1212, the fault is processed.

At step S1213, the power system enters the charging mode.

In other words, as shown in FIGS. 8 and 9, after the power supply device and the control module 80 detect themselves and no fault occurs therein, the capacity of the charge-discharge connection device can be determined by detecting a voltage of the CC signal, and it is determined whether the charge-discharge-discharge connection device is connected totally by detecting the CP signal. After it is determined that the charge-discharge-discharge connection device is connected totally, the message indicating the charge connection is normal and the charge is prepared is sent out, and the battery manager 108 controls the high voltage distribution box 90 to turn on the first switch K1 so as to precharge the first capacitor C1 and the bus capacitor C0. After the precharge, the first switch K1 turns off and the second switch K2 turns on. The control module 80 receives the message indicating BMS permits the charge and the second switch K2 turns on, and thus the charge-discharge is prepared, i.e., functions such as the AC charge function (G to V, grid to vehicle), the off-grid on-load function (V to L, vehicle to load), the grid connected function (V to G, vehicle to grid) and the vehicle-to-vehicle charging function (V to V, vehicle to vehicle), may be set via the dashboard.

(2) AC Charge Function (G to V)

When the power system receives a charging instruction from the dashboard 107, the control module 80 determines a minimum charging current among a maximum charging current allowed by the battery manager 108, a maximum power supply current of the power supply device and a rated current of the charge-discharge-discharge connection device i.e., the charge-discharge socket 20, and selects relevant charging parameters automatically. Moreover, the power system samples the AC electricity transmitted by the power supply device via a grid voltage sampling, so as to obtain a sampling value. The control module 80 solves an effective value of an AC voltage according to the sampling value and determines an AC frequency by capturing. An AC electric system can be determined according to the effective value of the AC voltage and the AC frequency, and control parameters can be selected according to the AC electric system. After the control parameters are determined, the control module 80 controls the three-phase precharging switch K9 in the second precharging module 106 and the contactor K10 in the sinusoidal filtering control module 104 to turn on, so as to charge the bus capacitor C0 in a PWM DC side. The control module 80 samples the bus voltage, i.e., the voltage of the bus capacitor C0. When the bus voltage reaches a predetermined control parameter, for example the bus voltage is the predetermined times of the voltage of the power battery 10, the control module 80 controls the three-phase switch K8 to turn on and the three-phase switch K9 to turn off. According to selected parameters, the control module 80 sends the PWM signal to control the bidirectional DC-AC module 50 to rectify an AC electricity to obtain a DC electricity. And then the control module 80 controls the bidirectional DC-DC module 30 to adjust the voltage of the DC electricity according to the voltage of the power battery 10, and finally the DC electricity is transmitted to the power battery 10. During the above process, the control module 80 performs a closed-loop current control on the power system according to the determined target charging current and phase currents fed back from a current sampling, and finally the in-vehicle power battery 10 is charged. Thus, by detecting the charge connection signal, the AC grid electric system and relevant information on whole vehicle battery management, a controllable rectification function can be performed by means of the bidirectional DC-AC module 50, and the in-vehicle power battery 10 can be charged by the single-phase power source and/or the three-phase power source via the bidirectional DC-DC module 30.

(3) Off-Grid on-Load Function (V to L)

When the power system receives a V to L instruction from the dashboard 107, it is first determined whether a state of charge (SOC) of the power battery 10 is in an allowable discharging range. If yes, an output electric system is selected according to the V to L instruction. A maximum output power is selected intelligently and controls parameters are given according to the rated current of the charge-discharge connection device, and then the power system enters a control process. First, the control module 80 controls the three-phase switch K8 and the contactor K10 to turn on and sends the PWM signal to control the bidirectional DC-DC module 30 to adjust the voltage of the DC electricity according to the voltage of the power battery and a given output voltage. After the voltage adjusted by the bidirectional DC-DC module 30 reaches a target value, the DC electricity is transmitted to the bidirectional DC-AC module 50 to be inverted into the AC electricity, and electric apparatuses may be powered by the AC electricity directly via a dedicated charge socket. During the above process, the control module 80 performs the adjustment according to a feedback of the voltage sampling, so as to ensure safe and reliable work of loads.

In other words, after the power system is powered, when the V to L instruction from the dashboard 107 and an output electric system requirement are received, the charge connection signal and relevant information on whole vehicle battery management are detected, the DC-DC voltage conversion is performed according to the voltage of the power battery, and the DC electricity is inverted into the AC electricity by means of the bidirectional DC-AC module 50, thus outputting a stable single-phase/three-phase AC voltage.

(4) Grid Connection Function (V to G)

When the power system receives a V to G instruction from the dashboard 107, it is first determined whether the state of charge (SOC) of the power battery 10 is in the allowable discharging range. If yes, an output electric system is selected according to the V to G instruction. And a maximum output power is selected intelligently and controls parameters are given according to the rated current of the charge-discharge-discharge connection device, and the power system enters a control process. First, the control module 80 controls the three-phase switch K8 and the contactor K10 to turn on and sends the PWM signal to control the bidirectional DC-DC module 30 to adjust the voltage of the DC electricity according to the voltage of the power battery and the given output voltage. Then, the DC electricity is transmitted to the bidirectional DC-AC module 50 to be inverted into the AC electricity. During the above process, the control module 80 performs the closed-loop current control on the power system according to a predetermined target discharging current and the phase currents fed back from the current sampling, so as to implement the grid connection discharging.

In other words, after the power system is powered, when the V to G instruction from the dashboard is received, the charge connection signal, the AC grid electric system and relevant information on the whole battery management are detected, the DC-DC voltage conversion is performed according to the voltage of the power battery, and the DC electricity is inverted into the AC electricity by means of the bidirectional DC-AC module 50, and thus the vehicle supplies the single-phase/three-phase AC electricity to the grid.

(5) Vehicle-to-Vehicle Charging Function (V to V)

The V to V function requires a dedicated connection plug. When the power system determines that the charge connection signal (i.e., CC signal) is effective and the connection plug is a dedicated charge plug for the V to V function via detecting a level of the connection plug, the power system is prepared for an instruction from the dashboard. For example, assuming vehicle A charges vehicle B, the vehicle A is in a discharging mode, i.e., the vehicle A is set to perform the off-grid on-load function, and the vehicle B is set in the AC charge mode. The control module 80 in vehicle A sends the message indicating the charge connection is normal and the charge is well prepared to the battery manager 108. The battery manager 108 controls a charge-discharge circuit to perform the precharging and sends the message indicating the charge is permitted and the charging contactor turns on to the control module 80 after the precharging is finished. Then the power system executes the discharging function and sends the PWM signal. After the vehicle B receives the charging instruction, the power system therein detects a CP signal which determines that the vehicle A is well prepared to supply power, and the control module 80 sends a normal connection message to the battery manager 108. After receiving the message, the battery manager 108 completes the precharge and informs the control module 80 that the whole power system is prepared for the charge. Then the vehicle-to-vehicle charging function starts, and thus vehicles can charge each other.

In other words, after the power system is powered on, when the V to V instruction from the dashboard 107 is received, the charge connection signal and relevant information on the whole vehicle battery management are detected, and the vehicle is set to perform the AC discharge function and sends the CP signal by simulating a charging box, so as to communicate with the vehicle to be charged. With the vehicle, the DC-DC voltage conversion is performed according to the voltage of the power battery, and the DC electricity is inverted into the AC electricity by means of the bidirectional DC-AC module 50, and thus the vehicle can charge another vehicle with the single-phase/three-phase AC electricity.

Figure 10:
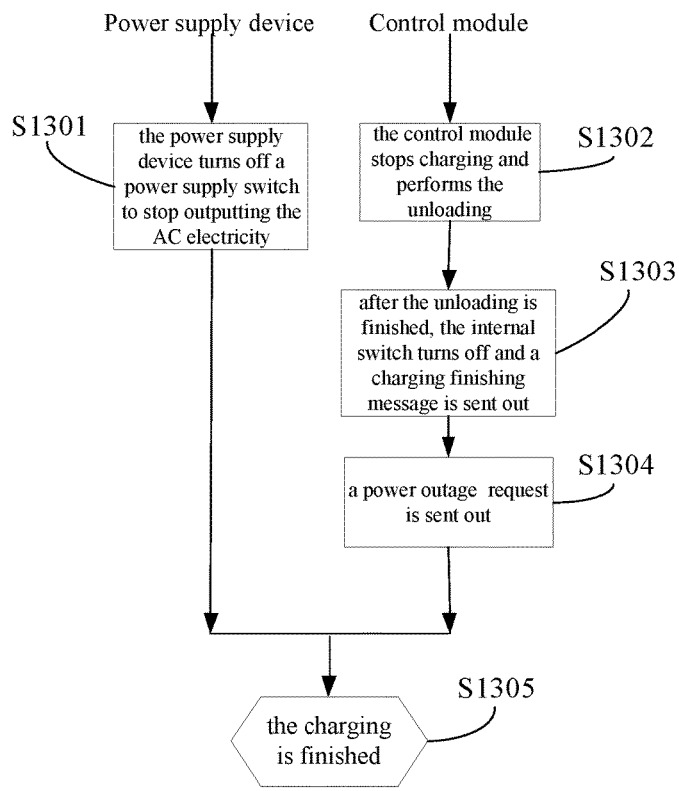
FIG. 10 is a flow chart of controlling a power system for an electric vehicle according to an embodiment of the present disclosure, when ending charging the electric vehicle.

In an embodiment of the present disclosure, as shown in FIG. 10, a process of controlling the power system when the charging is finished includes the following steps.

At step S1301, the power supply device turns off a power supply switch to stop outputting the AC electricity, and step S1305 is executed.

At step S1302, the control module stops charging and performs the unloading, and step S1303 is executed.

At step S1303, after the unloading is finished, the internal switch turns off and a charging finishing message is sent out.

At step S1304, a power outage request is sent out.

At step S1305, the charging is finished.

Figure 11:
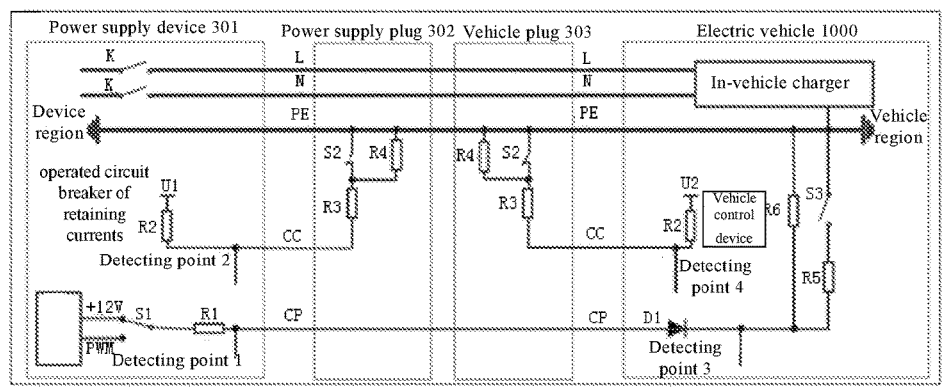
FIG. 11 is a schematic view showing a circuit connection between an electric vehicle according to an embodiment of the present disclosure and a power supply device.

As shown in FIG. 11, the power supply device 301 is connected with a vehicle plug 303 of an electric vehicle 1000 via a power supply plug 302, so as to charge the electric vehicle 1000. The power system of the electric vehicle 1000 detects a CP single via a detecting point 3 and detects a CC signal via a detecting point 4, and the power supply device 301 detects the CP signal via a detecting point 1 and detects the CC signal via a detecting point 2. After the charge is finished, the internal switches S2 in both the power supply plug 302 and the vehicle plug 303 turn off.

In an embodiment of the present disclosure, a plurality of power systems connected in parallel can be used in the electric vehicle to charge the power battery. For example, two power systems connected in parallel are used to charge the power battery, and the two power systems use a common control module.

Figure 12:
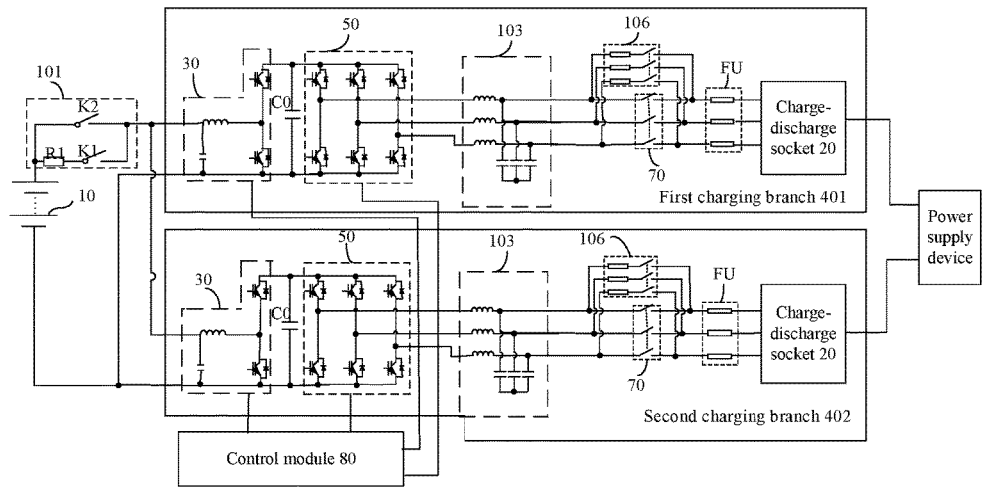
FIG. 12 is a schematic view of charging an electric vehicle by two power systems connected in parallel according to an embodiment of the present disclosure.

In this embodiment, as shown in FIG. 12, a charging system for the electric vehicle includes the power battery 10, a first charging branch 401, a second charging branch 402 and a control module 80. Each of the first charging branch 401 and the second charging branch 402 includes a charge-discharge socket 20, a bidirectional DC-DC module 30, a bus capacitor C0, a bidirectional DC-AC module 50, a sinusoidal filtering module 103, a charge-discharge control module 70 and a second precharging module 106. Moreover, each of the first charging branch 401 and the second charging branch 402 further includes a fuse FU. The power battery 10 is connected with the first charging branch 401 via the first precharging control module 101 and connected with the second charging branch 402 via the first precharging control module 101. The control module 80 is connected with the first charging branch 401 and the second charging branch 402 respectively, and configured to control the grid to charge the power battery 10 respectively via the first charging branch 401 and the second charging branch 402, when receiving a charging signal.

Figure 13:
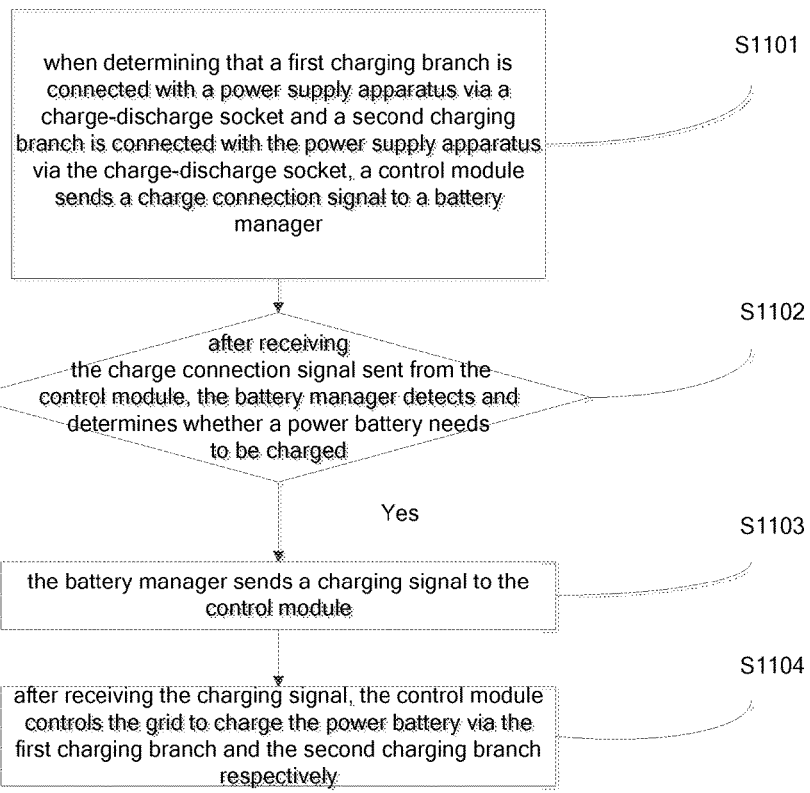
FIG. 13 is a flow chart of a method for controlling charging an electric vehicle according to an embodiment of the present disclosure.

In addition, as shown in FIG. 13, an embodiment of the present disclosure provides a method for controlling charging an electric vehicle. The method includes following steps.

At step S1101, when a control module determines that a first charging branch is connected with a power supply device via a charge-discharge socket, and a second charging branch is connected with the power supply device via the charge-discharge socket, the control module sends a charge connection signal to the battery manager.

At step S1102, after receiving the charge connection signal sent from the control module, the battery manager detects and determines whether a power battery needs to be charged, if yes, step S1103 is executed.

At step S1103, the battery manager sends a charging signal to the control module.

At step S1104, after receiving the charging signal, the control module controls the grid to charge the power battery via the first charging branch and the second charging branch respectively.

With the charging system for the electric vehicle and the method for controlling charging the electric vehicle according to the above embodiments of the present disclosure, the control module controls the grid to charge the power battery via the first charging branch and the second charging branch respectively, such that a charging power of the electric vehicle is increased and a charging time is shortened greatly, thus implementing a fast charge and saving a time cost.

In embodiments of the present disclosure, the power system has a wide compatibility and performs a single-phase/three-phase switching function, and it can be adapted to various electric systems of different countries.

Figure 14:
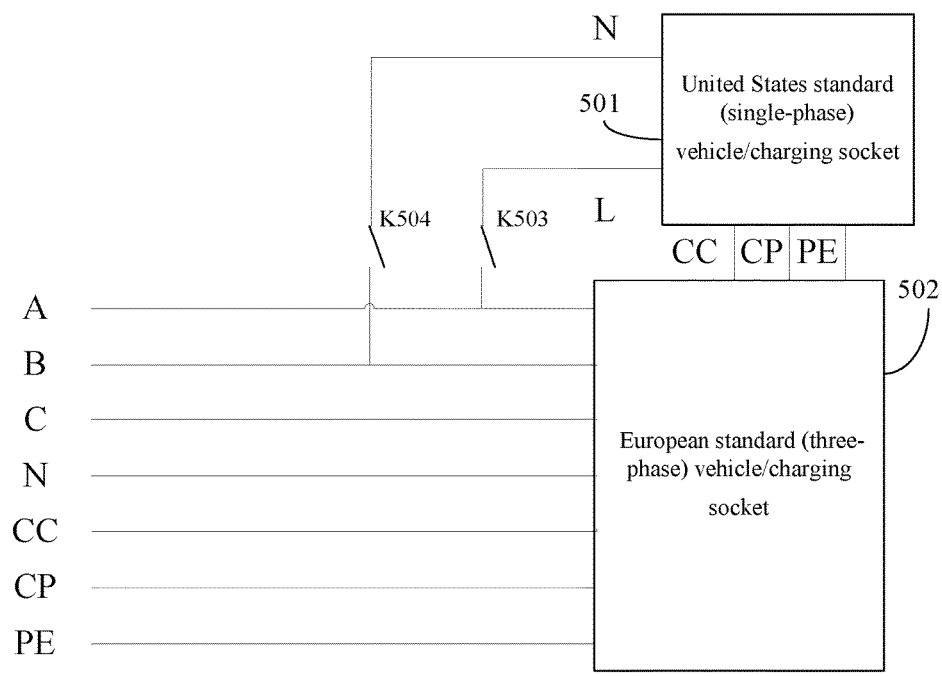
FIG. 14 is a schematic view of a charge-discharge socket according to an embodiment of the present disclosure.

Specifically, as shown in FIG. 14, the charge-discharge socket 20 has a function of switching between two charging sockets (such as a United States standard charging socket and a European standard charging socket). The charge-discharge socket 20 includes of a single-phase charging socket 501 such as the United States standard charging socket, a three-phase charging socket 502 such as the European standard charging socket and two high voltage connectors K503 and K504. A CC terminal, a CP terminal and a CE terminal are common terminals of the single-phase charging socket 501 and the three-phase charging socket 502. The single-phase charging socket 501 has an L-phase wire and an N-phase wire connected with an A-phase wire and a-B phase wire of the three-phase charging socket 502 via the high voltage connectors K503 and K504 respectively. When receiving a single-phase charge-discharge instruction, the controller module 80 controls the high voltage connectors K503 and K504 to turn on, such that the A-phase and B-phase wires of the three-phase charging socket 502 are connected with the L-phase and N-phase wires of the single-phase charging socket 501 respectively. Thus, the three-phase charging socket 502 is not in operation, and instead of the L-phase and N-phase wires of the single-phase charging socket 501, the A-phase and B-phase wires of the three-phase charging socket 502 are connected with the charging plug, and thus the control module 80 can implement the single-phase charge function normally.

Figure 15:
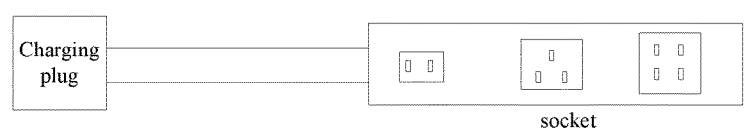
FIG. 15 is a schematic view of an off-grid on-load discharge plug according an embodiment of the present disclosure.

Alternatively, as shown in FIG. 15, a standard 7-core socket is used and the single-phase switch K7 is added between the N-phase and B-phase wires. When receiving the single-phase charge-discharge instruction, the control module 80 controls the single-phase switch K7 to turn on so as to connect the B-phase wire with the N-phase wire. Then, the A-phase and B-phase wires are used as the L-phase and N-phase wires respectively, and the connection plug should be a dedicated connection plug or a connection plug whose B-phase and C-phase wires are not used.

In other words, in embodiments of the present disclosure, the power system detects a voltage of the grid via the control module 80 and determines the frequency and the single-phase/three-phase of the grid via calculation, so as to obtain the grid electric system. And then the control module 80 selects different control parameters according to a type of the charge-discharge socket 20 and the grid electric system. Furthermore, the control module 80 controls the bidirectional DC-AC module 50 to rectify the AC electricity controllably to obtain the DC electricity and controls the bidirectional DC-DC module 30 to adjust the voltage of the DC electricity according to the voltage of the power battery. Finally, the DC electricity is transmitted to the power battery 10.

In another embodiment of the present disclosure, as shown in FIG. 15, an off-grid on-load charging socket includes a two-core, three-core and four-core socket connected with a charging plug and is configured to output single-phase, three-phase and four-phase current.

Figure 16:
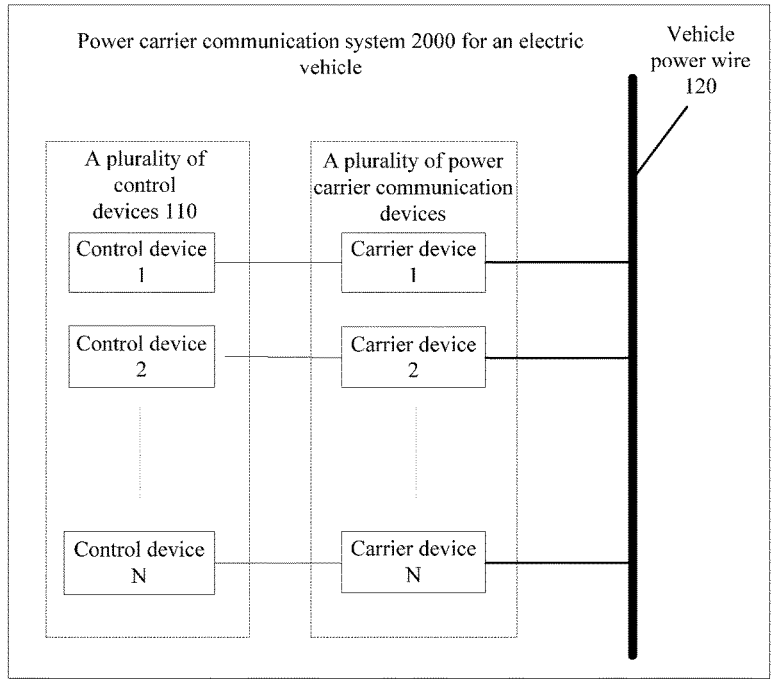
FIG. 16 is a block diagram of a power carrier communication system for an electric vehicle according to an embodiment of the present disclosure.

FIG. 16 is a block diagram of a power carrier communication system for an electric vehicle according to an embodiment of the present disclosure.

As shown in FIG. 16, the power carrier communication 2000 includes a plurality of control devices 110, a vehicle power wire 120 and a plurality of power carrier communication devices 130.

Specifically, each control device 110 has a communication interface, in which the communication interface may be, for example, but is not limited to, a serial communication interface SCI. The vehicle power wire 120 supplies power to the control devices 110 and the control devices 110 communicate with each other via the vehicle power wire 120. The power carrier communication devices 130 correspond to the control devices 110 respectively, and the control devices 110 are connected with corresponding power carrier communication devices 130 via their own communication interfaces respectively, and the power carrier communication devices 130 are connected with each other via the vehicle power wire 120. The power carrier communication devices 130 obtain a carrier signal from the vehicle power sire 120 so as to demodulate the carrier signal and send the demodulated carrier signal to the corresponding control device 110, and also receive and demodulate information sent from the corresponding control device 110 and send the demodulated information to the vehicle power wire 120.

With reference to FIG. 16, the plurality of control devices 110 include N control devices (N is larger than or equal to 2 and is an integer). The plurality of power carrier communication devices 130 corresponding to the plurality of control devices 110 include N power carrier communication devices. For example, when the control device 1 needs to communicate with the control device 2, the control device 2 first sends a carrier signal to the power carrier communication device 2, and the power carrier communication device 2 demodulates the carrier signal and sends the demodulated carrier signal to the vehicle power wire 120. Then the power carrier communication device 1 obtains the carrier signal from the vehicle power cable 120, and sends the demodulated carrier signal to the control device 1.

Figure 17:
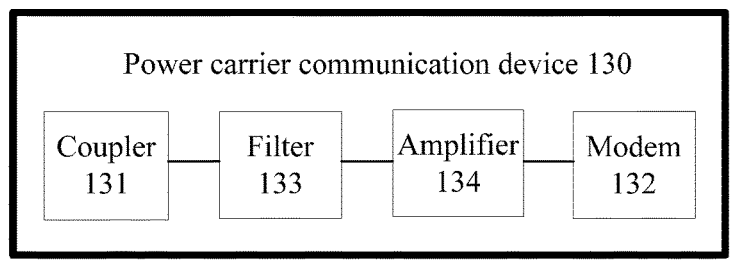
FIG. 17 is a block diagram of a power carrier communication device according to an embodiment of the present disclosure.

As shown in FIG. 17, each power carrier communication device 130 includes a coupler 131, a filter 133, an amplifier 134 and a modem 132 connected sequentially.

Figure 18:
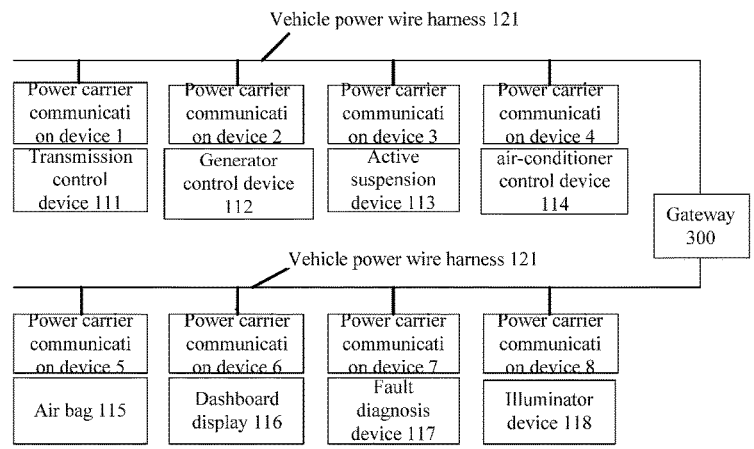
FIG. 18 is a schematic view showing communications between eight power carrier communication devices and corresponding control devices according to an embodiment of the present disclosure.

As shown in FIG. 18, the plurality of power carrier communication devices 130, such as eight power carrier communication devices 1-8, are connected with a gateway 300 via a vehicle power wire 121 and a vehicle power wire 122, and each power carrier communication device 130 corresponds to one control device. For example, the power carrier communication device 1 corresponds to a transmission control device 111, the power carrier communication device 2 corresponds to a generator control device 112, the power carrier communication device 3 corresponds to an active suspension device 113, the power carrier communication device 4 corresponds to an air-conditioner control device 114, the power carrier communication device 5 corresponds to an air bag 115, the power carrier communication device 6 corresponds to a dashboard display 116, the power carrier communication device 7 corresponds to a fault diagnosis device 117, and the power carrier communication device 8 corresponds to an illumination device 118.

Figure 19:
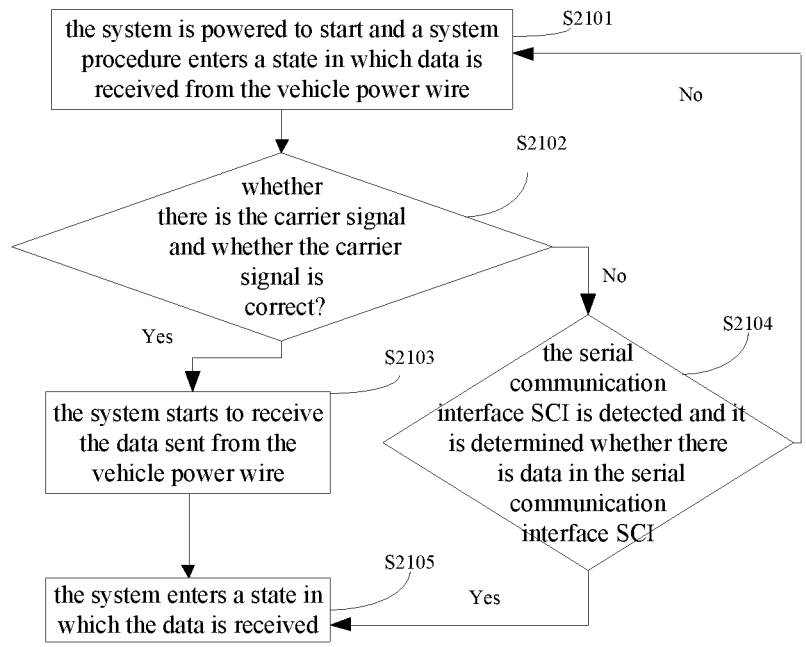
FIG. 19 is a flow chart of a method for receiving data by a power carrier communication system according to an embodiment of the present disclosure.

In embodiments of the present disclosure, as shown in FIG. 19, a method for receiving data by a power carrier communication system includes following steps.

At step S2101, the system is powered to start and a system procedure is in a state in which data is received from a vehicle power wire.

At step S2102, it is determined whether there is the carrier signal and whether the carrier signal is correct, if yes, step S2103 is executed; if no, step S2104 is executed.

At step S2103, the system starts to receive the data sent from the vehicle power cable, and step S2105 is executed.

At step S2104, the serial communication interface SCI is detected and it is determined whether there is data in the serial communication interface SCI, if yes, step S2105 is executed; if no, step S2101 is returned.

At step S2105, the system enters a state in which the data is received.

With the power carrier communication system for the electric vehicle according to embodiments of the present disclosure, a data transmission and sharing among various control systems in the electric vehicle can be achieved without increasing internal cable bundles of the vehicle. Moreover, a power carrier communication using the power wire as a communication medium avoids constructing and investing a new communication network, thus reducing the manufacturing cost and maintenance difficulty.

Figure 20:
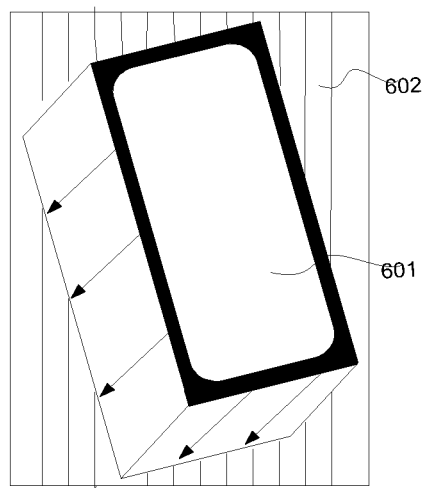
FIG. 20 is a schematic view of a house of a power system for an electric vehicle according to an embodiment of the present disclosure.

In an embodiment of the present disclosure, the above power system for the electric vehicle is cooled in a water-cooling mode. As shown in FIG. 20, a house of the power system is constructed such that inductors and IGBTs share common heat dissipation channels, thus greatly saving space. The house is divided into an upper layer and a lower layer. A back surface of the heat dissipation channels for IGBTs is configured to cool the sinusoidal filtering module. The back surface is shaped into a plurality of inductor trenches 601 according to a shape of an inductor. Side walls of the inductor trenches 601 are configured to conduct heat to a channel 602 for dissipation. In addition, the inductor is fixed by a glue having a high heat conductivity, thus improving a capability of heat dissipation and a mechanical strength of the whole structure. The power system according to embodiments of the present disclosure is cooled in the water-cooling mode, which has a better heat dissipation effect than a wind-cooling mode. A size of the sinusoidal filter module can be reduced with a same power, and thus a size and a weight of the whole power system can be reduced.

In addition, embodiments of another aspect of the present disclosure provide an electric vehicle, including the above power system. The electric vehicle can be charged under a high power with a three-phase or single-phase electricity, such that a user may charge the electric vehicle conveniently, promptly, anytime and anywhere, thus saving a time cost and satisfying the requirement of users. Especially, the power battery can be activated in a low temperature by a bidirectional inverter charge-discharge system, thus saving cost and reducing energy consumption.

Figure 21:
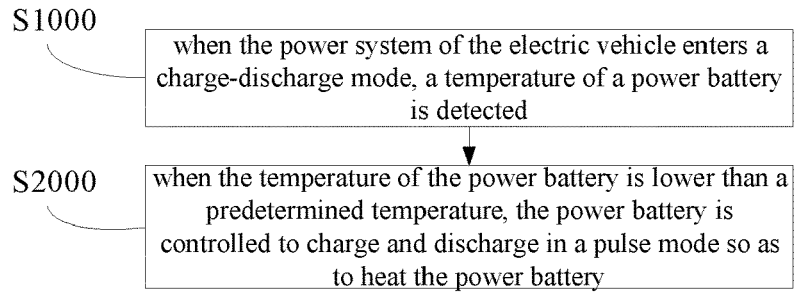
FIG. 21 is a flow chart of a method for charging a power battery of an electric vehicle according to an embodiment of the present disclosure.

As shown in FIG. 21, a method for charging the power battery of the electric vehicle is provided according to embodiments of the present disclosure. The method includes following steps.

At step S1000, when the power system of the electric vehicle is in a charge-discharge mode, a temperature of a power battery is detected.

At step S2000, when the temperature of the power battery is lower than a predetermined temperature, the power battery is controlled to charge and discharge in a pulse mode so as to heat the power battery.

Moreover, when the temperature of the power battery is higher than or equal to the predetermined temperature, the power battery is controlled to stop charging and discharging in the pulse mode to stop heating the power battery, and the power battery is further controlled to charge and discharge in a normal mode.

In other words, in embodiments of the present disclosure, when the power system for the electric vehicle is in the charge-discharge mode and a charge connection and a charge detection are finished, a battery manager detects the temperature of the power battery. When the temperature of the power battery is lower than the predetermined temperature, the battery manager sends an instruction to the control module and the control module starts a heating mode to control the power battery to charge and discharge in the pulse mode. The discharge is performed via the V to G function and the charge is performed via the G to V function. When the temperature of the power battery is increased and reaches the predetermined temperature, the battery manager sends an instruction. After receiving the instruction sent from the battery manager, the control module controls the power battery to charge and discharge in the normal mode.

Figure 22:
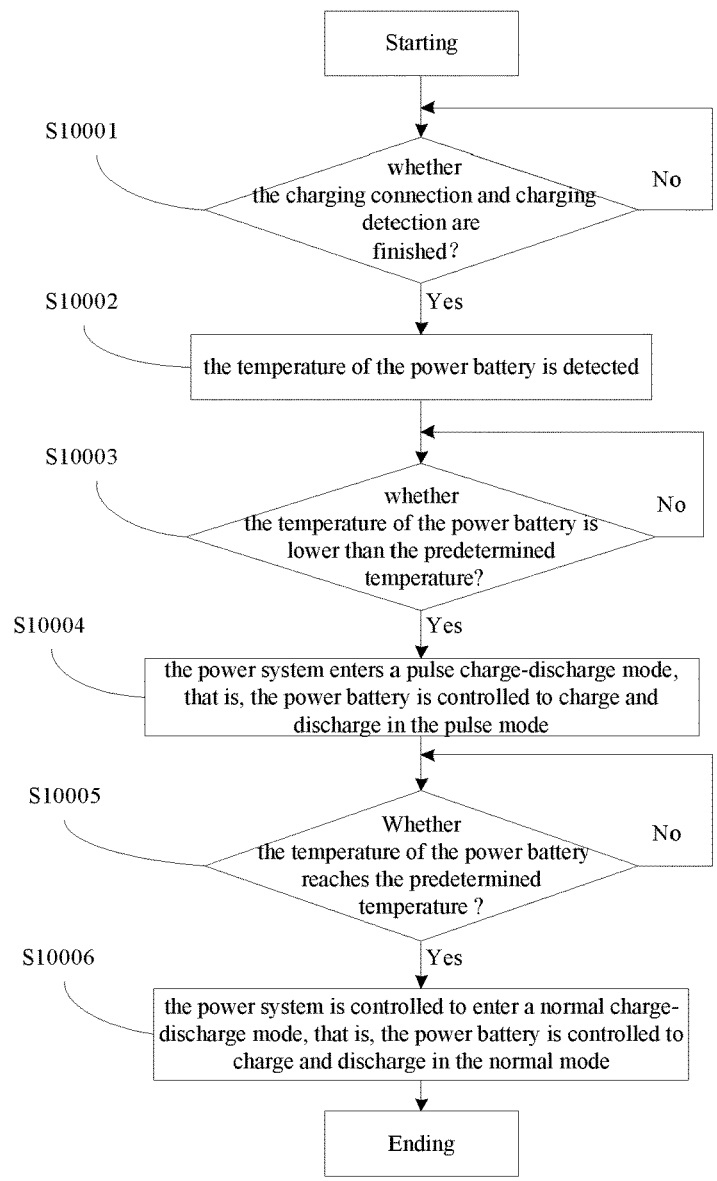
FIG. 22 is a flow chart of a method for charging a power battery of an electric vehicle according to another embodiment of the present disclosure.

In an embodiment of the present disclosure, as shown in FIG. 22, the method for charging the power battery of the electric vehicle includes following steps.

At step S10001, it is determined whether the charge connection and charge detection are finished. If yes, step S10002 is executed; if no, step S10001 is returned and continue determining.

At step S10002, the temperature of the power battery 10 is detected.

At step S10003, it is determined whether the temperature of the power battery 10 is lower than the predetermined temperature (i.e., a minimum activating temperature). If yes, step S10004 is executed; if no, step S10003 is returned and continue determining.

At step S10004, the power system is in a pulse charge-discharge mode, that is, the power battery 10 is controlled to charge and discharge in the pulse mode.

At step S10005, it is determined whether the temperature of the power battery 10 reaches the predetermined temperature. If yes, step S10006 is executed; if no, step S10005 is returned and continue determining.

At step S10006, the power system is controlled to enter a normal charge-discharge mode, that is, the power battery 10 is controlled to charge and discharge in the normal mode.

With the method for charging the power battery of the electric vehicle, when the temperature of the power battery is low, the power battery is controlled to charge and discharge in a pulse mode so as to heat the power battery, thus increasing the temperature of the power battery and activating the power battery. Accordingly, the power battery can be charge and discharged in a normal mode. In addition, the method for charging the power battery of the electric vehicle is simple and reliable.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A power system for an electric vehicle, comprising:
   a bidirectional DC-DC module having a first DC terminal connected with a first terminal of a power battery and a second DC terminal connected with a second terminal of the power battery, wherein the first DC terminal is a common terminal for an input to and an output from the bidirectional DC-DC module;
   a driving control switch having a first terminal connected with the second terminal of the power battery and a second terminal connected with a third DC terminal of the bidirectional DC-DC module;
a bidirectional DC-AC module having a first DC terminal connected with the second terminal of the driving control switch and a second DC terminal connected with the first terminal of the power battery;
a motor control switch having a first terminal connected with an AC terminal of the bidirectional DC-AC module and a second terminal configured to connect with a motor;
a charge-discharge control module having a first terminal connected with the AC terminal of the bidirectional DC-AC module and a second terminal connected with a charge-discharge socket;
a battery manager connected with the power battery and configured to detect a temperature of the power battery; and
a control module connected with a third terminal of the driving control switch, a third terminal of the motor control switch a third terminal of the charge-discharge control module and the battery manager respectively, and configured to control the driving control switch, the motor control switch and the charge-discharge control module so as to control the power system to enter a charge-discharge mode, and to control the power battery to charge and discharge in a pulse mode so as to heat the power battery when the temperature of the power battery is lower than a predetermined temperature.

2. The power system according to claim 1, wherein the control module is further configured to control the power battery to stop charging and discharging in the pulse mode so as to stop heating the power battery and to control the power battery to charge and discharge in a normal mode, when the temperature of the power battery is higher than or equal to the predetermined temperature.

3. The power system according to claim 1, wherein the control module is further configured to turn off the driving control switch to start the bidirectional DC-DC module, to turn off the motor control switch and to start the charge-discharge control module, so as to control the power system to enter the charge-discharge mode.

4. The power system according to claim 1, further comprising:
a first precharging control module having a first terminal connected with the second terminal of the power battery and a second terminal connected with the second DC terminal of the bidirectional DC-DC module, and configured to precharge a first capacitor in the bidirectional DC-DC module and a bus capacitor connected between the first DC terminal and the third DC terminal of the bidirectional DC-DC module.

5. The power system according to claim 4, wherein the first precharging control module comprises:
a first switch having a second terminal connected with the second DC terminal of the bidirectional DC-DC module;
a first resistor having a first terminal connected with a first terminal of the first switch and a second terminal connected with the second terminal of the power battery; and
a second switch having a first terminal connected with the second terminal of the first resistor and a second terminal connected with the second terminal of the first switch,
wherein when the power system starts, the control module controls the first switch to turn on to precharge the first capacitor in the bidirectional DC-DC module and the bus capacitor; and when a voltage of the bus capacitor is a predetermined times of a voltage of the power battery, the control module controls the first switch to turn off and controls the second switch to turn on.

6. The power system according to claim 4, wherein the bidirectional DC-DC module comprises:
a first switching transistor and a second switching transistor connected in series, and connected between the first DC terminal and the third DC terminal of the bidirectional DC-DC module, and controlled by the control module, in which a first node is defined between the first switching transistor and the second switching transistor;
a first diode connected with the first switching transistor in inverse parallel;
a second diode connected with the second switching transistor in inverse parallel;
a first inductor having a first terminal connected with the first node and a second terminal connected with the second terminal of the power battery; and
the first capacitor having a first terminal connected with the second terminal of the first inductor and a second terminal connected with the first terminal of the power battery.

7. The power system according to claim 1, further comprising:
a leakage current reducing module connected between the first DC terminal and the third DC terminal of the bidirectional DC-DC module.

8. The power system according to claim 7, wherein the leakage current reducing module comprises:
a second capacitor and a third capacitor, the second capacitor having a first terminal connected with a first terminal of the third capacitor and a second terminal connected with the third DC terminal of the bidirectional DC-DC module, and the third capacitor having a second terminal connected with the first DC terminal of the bidirectional DC-DC module, in which a second node is defined between the second capacitor and the third capacitor.

9. The power system according to claim 1, further comprising:
a sinusoidal filtering module connected between the bidirectional DC-AC module and the charge-discharge control module.

10. The power system according to claim 9, further comprising:
a sinusoidal filtering control module connected between the second node and the sinusoidal filtering module, in which when the power system is in a driving mode, the control module controls the sinusoidal filtering control module to turn off.

11. The power system according to claim 1, further comprising:
an EMI-filter module connected between the charge-discharge socket and the charge-discharge control module and configured to filter interference of conduction and radiation.

12. The power system according to claim 9, further comprising:
a second precharging module connected with the charge-discharge control module in parallel and configured to precharge a capacitor in the sinusoidal filtering module.

13. The power system according to claim 1, wherein the charge-discharge control module comprises:
   a three-phase switch and/or a single-phase switch configured to implement a three-phase charge or a single-phase charge.

14. A method for charging a power battery of an electric vehicle, comprising:
   detecting a temperature of the power battery, when a power system of the electric vehicle is in a charge-discharge mode;
   controlling the power battery to charge and discharge in a pulse mode so as to heat the power battery, when the temperature of the power battery is lower than a predetermined temperature;
   controlling the power battery to stop charging or discharging in the pulse mode when the temperature of the Rower battery is higher than or equal to the predetermined temperature.

15. The method according to claim 14, further comprising:
   controlling the power battery to charge and discharge in a normal mode, when the temperature of the power battery is higher than or equal to the predetermined temperature.

16. An electric vehicle, comprising:
   a motor;
   a power battery for providing power to the motor;
   a charge-discharge socket;
   a bidirectional DC-DC module having a first DC terminal connected with a first terminal of the power battery and a second DC terminal connected with a second terminal of the power battery, wherein the first DC terminal is a common terminal for an input to and an output from the bidirectional DC-DC module;
   a driving control switch having a first terminal connected with the second terminal of the power battery and a second terminal connected with a third DC terminal of the bidirectional DC-DC module;
   a bidirectional DC-AC module having a first DC terminal connected with the second terminal of the driving control switch and a second DC terminal connected with the first terminal of the power battery;
   a motor control switch having a first terminal connected with an AC terminal of the bidirectional DC-AC module and a second terminal connected with the motor;
   a charge-discharge control module having a first terminal connected with the AC terminal of the bidirectional DC-AC module and a second terminal connected with the charge-discharge socket;
   a battery manager connected with the power battery and configured to detect a temperature of the power battery;
   a control module connected with a third terminal of the driving control switch, a third terminal of the motor control switch a third terminal of the charge-discharge control module and the battery manager respectively, and configured to control the driving control switch, the motor control switch and the charge-discharge control module so as to control the power system to enter a charge-discharge mode, and to control the power battery to charge and discharge in a pulse mode so as to heat the power battery when the temperature of the power battery is lower than a predetermined temperature.

17. The electric vehicle according to claim 16, wherein the control module is further configured to control the power battery to stop charging and discharging in the pulse mode so as to stop heating the power battery and to control the power battery to charge and discharge in a normal mode, when the temperature of the power battery is higher than or equal to the predetermined temperature.

18. The electric vehicle according to claim 16, wherein the control module is further configured to turn off the driving control switch to start the bidirectional DC-DC module, to turn off the motor control switch and to start the charge-discharge control module, so as to control the power system to enter the charge-discharge mode.

19. The electric vehicle according to claim 16, further comprising:
   a first precharging control module having a first terminal connected with the second terminal of the power battery and a second terminal connected with the second DC terminal of the bidirectional DC-DC module, and configured to precharge a first capacitor in the bidirectional DC-DC module and a bus capacitor connected between the first DC terminal and the third DC terminal of the bidirectional DC-DC module,
   wherein the first precharging control module comprises:
      a first switch having a second terminal connected with the second DC terminal of the bidirectional DC-DC module;
      a first resistor having a first terminal connected with a first terminal of the first switch and a second terminal connected with the second terminal of the power battery; and
      a second switch having a first terminal connected with the second terminal of the first resistor and a second terminal connected with the second terminal of the first switch,
   wherein when the power system starts, the control module controls the first switch to turn on to precharge the first capacitor in the bidirectional DC-DC module and the bus capacitor, and when a voltage of the bus capacitor is a predetermined times of a voltage of the power battery, the control module controls the first switch to turn off and controls the second switch to turn on.

20. The method according to claim 14, further comprising:
   turning off a driving control switch to start a bidirectional DC-DC module; and
   turning off a motor control switch to start a charge-discharge control module, so as to control the power system to enter the charge-discharge mode.

* * * * *